United States Patent
Du et al.

(10) Patent No.: US 9,018,875 B2
(45) Date of Patent: Apr. 28, 2015

(54) METHOD FOR CONTROLLING ROTATION RATE OF ELECTRIC MOTOR

(71) Applicants: Shenzhen BYD Auto R&D Company Limited, Shenzhen, Guangdong (CN); BYD Company Limited, Shenzhen, Guangdong (CN)

(72) Inventors: Zhiyong Du, Shenzhen (CN); Xing Chen, Shenzhen (CN); Kai Xiao, Shenzhen (CN)

(73) Assignees: Shenzhen BYD Auto R&D Company Limited, Guangdong (CN); BYD Company Limited, Guangdong (CN)

( * ) Notice: Subject to any disclaimer, the term of this patent is extended or adjusted under 35 U.S.C. 154(b) by 161 days.

(21) Appl. No.: 13/800,823

(22) Filed: Mar. 13, 2013

(65) Prior Publication Data
US 2013/0257325 A1 Oct. 3, 2013

(51) Int. Cl.
*H02P 6/14* (2006.01)
*H02P 21/00* (2006.01)

(52) U.S. Cl.
CPC ........ *H02P 21/0035* (2013.01); *H02P 21/0021* (2013.01)

(58) Field of Classification Search
CPC ...... H02P 6/085; H02P 21/0035; H02P 6/182
USPC ............. 318/400.27, 400.02, 400.34, 400.01, 318/400.15, 400.41, 432, 807, 811, 434
See application file for complete search history.

(56) References Cited

U.S. PATENT DOCUMENTS

| | | | |
|---|---|---|---|
| 2009/0314564 A1* | 12/2009 | Okamura et al. | 180/65.285 |
| 2010/0256896 A1* | 10/2010 | Kitano et al. | 701/113 |
| 2011/0031919 A1* | 2/2011 | Green | 318/432 |
| 2011/0166750 A1* | 7/2011 | Nakano | 701/41 |

* cited by examiner

*Primary Examiner* — Karen Masih
(74) *Attorney, Agent, or Firm* — Brinks Gilson & Lione

(57) ABSTRACT

A method for controlling a rotation rate of an electric motor includes the s following steps: determining if an absolute value of a difference between an objective rotation rate of the electric motor and an actual rotation rate of the electric motor is greater than or equal to a predetermined value, and if yes, compensating a q axis current of the electric motor to adjust the rotation rate.

14 Claims, 2 Drawing Sheets

METHOD FOR CONTROLLING ROTATION RATE OF ELECTRIC MOTOR

CROSS-REFERENCE TO RELATED APPLICATION

This application claims priority to and benefit of Chinese Patent Application Serial No. 201210083802.4, filed on Mar. 27, 2012, the entire contents of which are incorporated herein by reference.

TECHNICAL FIELD

The present disclosure relates to an electric motor control field, and more particularly to a method for controlling a rotation rate of an electric motor.

BACKGROUND

Conventionally, a rotation rate of an electric motor (such as a synchronous electric motor without position sensor) is controlled by adjusting a proportional integral (PI) of the rotation rate. By using this method, the rotation rate may vary according to a normal variation of a load, thus ensuring a correct output of a torque. However, when the variation of the load or a variation of the rotation rate is relatively large, using only the PI adjustment may lead to a low response or a large fluctuation of the rotation rate.

SUMMARY

The embodiments of the present disclosure is directed to solving at least one of the defects. Accordingly, a method for controlling a rotation rate of an electric motor is provided.

The method for controlling the rotation rate of the electric motor comprises following steps: judging whether an absolute value of a difference between an objective rotation rate of the electric motor and an actual rotation rate of the electric motor is greater than or equal to a predetermined value; and if yes, compensating a q axis current of the electric motor to adjust the rotation rate.

In one embodiment, the predetermined value ranges from 100 r/min to 300 r/min.

In one embodiment, compensating a q axis current of the electric motor to adjust the rotation rate comprises: compensating a q axis current of the electric motor according to $I_q'=I_q-K*\Delta n$, where K is a coefficient, $I_q'$ is an actual value of the q axis current, $I_q$ is a given value of the q axis current, and $\Delta n$ is a difference between an average of an actual rotation rate during current N cycles and an average of an actual rotation rate during N cycles before the current N cycles, $N \geq 1$; and compensating a torque by compensating the q axis current of the electric motor to adjust the rotation rate.

In one embodiment, if yes, compensating a q axis current of the electric motor to adjust the rotation rate comprises: if the difference between the objective rotation rate and the actual rotation rate is greater than or equal to the predetermined value, judging whether $\Delta n<0$; if yes, $I_q'=I_q-K*\Delta n$ and otherwise $I_q'=I_q$; and compensating a torque by compensating the q axis current of the electric motor to adjust the rotation rate, where K is a coefficient, $I_q'$ is an actual output of the q axis current, $I_q$ is a given output of the q axis current, and $\Delta n$ is a difference between an average of an actual rotation rate during current N cycles and an average of an actual rotation rate during N cycles before the current N cycles, $N \geq 1$.

In one embodiment, if yes, compensating a q axis current of the electric motor to adjust the rotation rate comprises: if the difference between the actual rotation rate and the objective rotation rate is greater than or equal to the predetermined value, judging whether $\Delta n>0$; if yes, $I_q'=I_q-K*\Delta n$ and otherwise $I_q'=I_q$; and compensating a torque by compensating the q axis current of the electric motor to adjust the rotation rate, where K is a coefficient, $I_q'$ is an actual output of the q axis current, $I_q$ is a given output of the q axis current, and $\Delta n$ is a difference between an average of an actual rotation rate during current N cycles and an average of an actual rotation rate during N cycles before the current N cycles, $N \geq 1$.

In one embodiment, N ranges from 32 to 128.

In one embodiment, K ranges from 0.05 to 0.2.

In one embodiment, the method further comprises: if the absolute value of the difference between the objective rotation rate and the actual rotation rate is less than the predetermined value, using a proportional integral method to adjust the rotation rate.

In one embodiment, the proportional integral method comprises: calculating a difference $err(k)$ between the objective rotation rate and the actual rotation rate at a current time; and adjusting the rotation rate according to $Out(k)=Out(k-1)+(Kp+Ki)*err(k)$, where Kp is a proportional coefficient, Ki is an integral coefficient, $Out(k)$ is an actual rotation rate at the current time, and $Out(k-1)$ is an actual rotation rate at a previous time.

With the method for controlling the rotation rate of the electric motor, a defect that when a variation of a load or a variation of the rotation rate is relative large, it will lead to a low response or a large fluctuation of the rotation rate by only using the PI method is avoided. Therefore, even the variation of the load or the variation of the rotation rate is relatively large, the rotation rate can also vary rapidly with the variation of the load, which is particularly applicable for a system with high requirement on stability.

Additional aspects and advantages of the embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Figure 1:
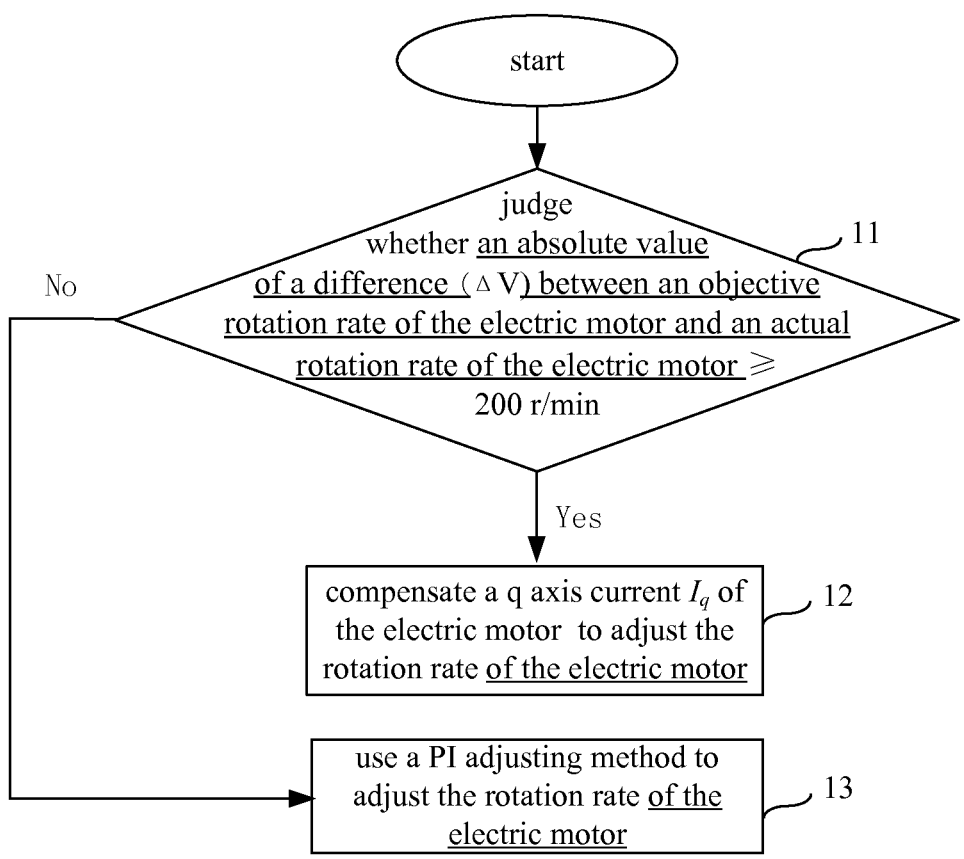
FIG. 1 is a flow chart of a method for controlling a rotation rate of an electric motor according to a first embodiment of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

A method for controlling a rotation rate of an electric motor is provided by an embodiment of the present disclosure. The method comprises following steps.

In step S1, it is judged that whether an absolute value of a difference between an objective rotation rate of the electric motor and an actual rotation rate of the electric motor is greater than or equal to a predetermined value.

In step S2, if yes, a q axis current $I_q$ of the electric motor is compensated to adjust the rotation rate.

It is found that there is a relationship between a torque of the electric motor and the q axis current $I_q$ of the electric motor, which may be represented by a formula. However, the relationship may be different for different types of electric motors, that is, there are different formulas. Therefore, controlling $I_q$ is equivalent to controlling the torque, and the rotation rate is controlled accordingly. Thus, a compensation of the rotation rate may be realized by a compensation of $I_q$.

Now an AC (alternate current) electric motor is taken as an example to illustrate the relationship between the torque T and the q axis current $I_q$. The torque T of the AC electric motor may be represented by a formula: $T=1.5p[\Psi f*I_q+(Ld-Lq)*Id*I_q)]$, where p is a number of a pole pair of the electric motor, $\Psi f$ is a magnetic linkage of the electric motor, Ld is an inductance of a d axis of the electric motor, Lq is an inductance of the q axis of the electric motor, and Id is a d axis current of the electric motor. It can be known from the formula that T is in linear proportion to $I_q$. Particularly, if Id=0, T is in direct proportion to $I_q$.

With the method for controlling the rotation rate of the electric motor, a defect that when a variation of a load or a variation of the rotation rate is relatively large, it will lead to a low response or a large fluctuation of the rotation rate by only using the PI adjusting method is avoided. Therefore, even the variation of the load or the variation of the rotation rate is relatively large, the rotation rate can also vary rapidly according to the variation of the load, which is particularly useful to a system with high requirement on stability.

Specifically, in step S2, the q axis current $I_q$ may be compensated according to $$I_q'=I_q-K*\Delta n,$$

where K is a coefficient, $I_q'$ is an actual value of the q axis current, $I_q$ is a given value of the q axis current, and $\Delta n$ is a difference between an average of an actual rotation rate during current N cycles and an average of an actual rotation rate during N cycles before the current N cycles, N≥1.

It should be noted that, the current N cycles refer to N cycles starting with a current cycle (denoted as $M_{2N}$) and backtracking to an $M_{N+1}^{th}$ cycle, and the N cycles before the current N cycles refer to N cycles starting with an $M_N^{th}$ cycle and backtracking to an $M_1^{th}$ cycle. Taking N=64 as an example, the current N cycles refer to $[M_{128}, M_{65}]$, and the N cycles before the current N cycles refer to $[M_{64}, M_1]$, where $M_{128}$ is the current cycle.

A value of N should be selected properly, because a too large N may lead to a hysteresis and offer no compensation effect, while a too small N may lead to a poor precision. In one embodiment, N may range from 32 to 128. Preferably, N=64. In one embodiment, K may range from 0.05 to 0.2. Similarly, the predetermined value should be selected properly, because a too large predetermined value may not meet a requirement of rapid response, while a too small predetermined value may lead to a fluctuation. Preferably, the predetermined value may range from 100 r/min to 300 r/min.

A specific embodiment is described below to make the present disclosure be better understood by these skilled in the art. In this embodiment, as an example, the predetermined value takes 200 r/min.

FIG. 1 is a flow chart of a method for controlling the rotation rate of the electric motor according to a first embodiment of the present disclosure. As shown in FIG. 1, the method comprises following steps.

In step 11, it is judged whether an absolute value of a difference ($\Delta$V) between an objective rotation rate of the electric motor and an actual rotation rate of the electric motor is greater than or equal to 200 r/min.

In step 12, if yes, a q axis current $I_q$ of the electric motor is compensated to adjust the rotation rate (for example, to realize a rapid response of the rotation rate), and the process is terminated.

In step 13, if no, a PI adjusting method is used to adjust the rotation rate.

It should be noted that, the PI adjustment may refer to any method in prior art for performing a PI adjustment on the rotation rate. In order to better understand the present disclosure, a specific PI adjusting method is shown as follows. This PI adjusting method may comprises following steps.

In step A1: a difference err(k) between the objective rotation rate and the actual rotation rate at a current time is calculated.

In step A2: the rotation rate is adjusted according to Out(k)=Out(k-1)+(Kp+Ki)*err(k), where Kp is a proportional coefficient, Ki is an integral coefficient, Out(k) is an actual rotation rate at the current time, and Out(k-1) is an actual rotation rate at a previous time. A specific value of Kp and Ki may be set according to practical requirement.

In this embodiment, Kp is mainly used for generating a direct proportion to the difference so as to rapidly reduce the difference. However, a steady state error will exist with only the direct proportion, so an integral (i.e., Ki) is required to eliminate the steady state error.

In this embodiment, Kp and Ki may be selected by giving preference to proportion. Firstly, Ki is given a value of zero; secondly, the objective rotation rate is modified (for example, make the objective rotation rate change greatly); thirdly, different Kps are tried to choose one Kp with which the actual rotation rate may rapidly fluctuate around the objective rotation rate; fourthly, Ki is used. It should be noted that, Ki does not need to be too large, and because the integral acts on a time axis, an integration period needs to be selected. When the actual rotation rate may rapidly fluctuate around the objective rotation rate and a fluctuation value is relatively small, the current Kp and Ki may be considered qualified.

Figure 2:
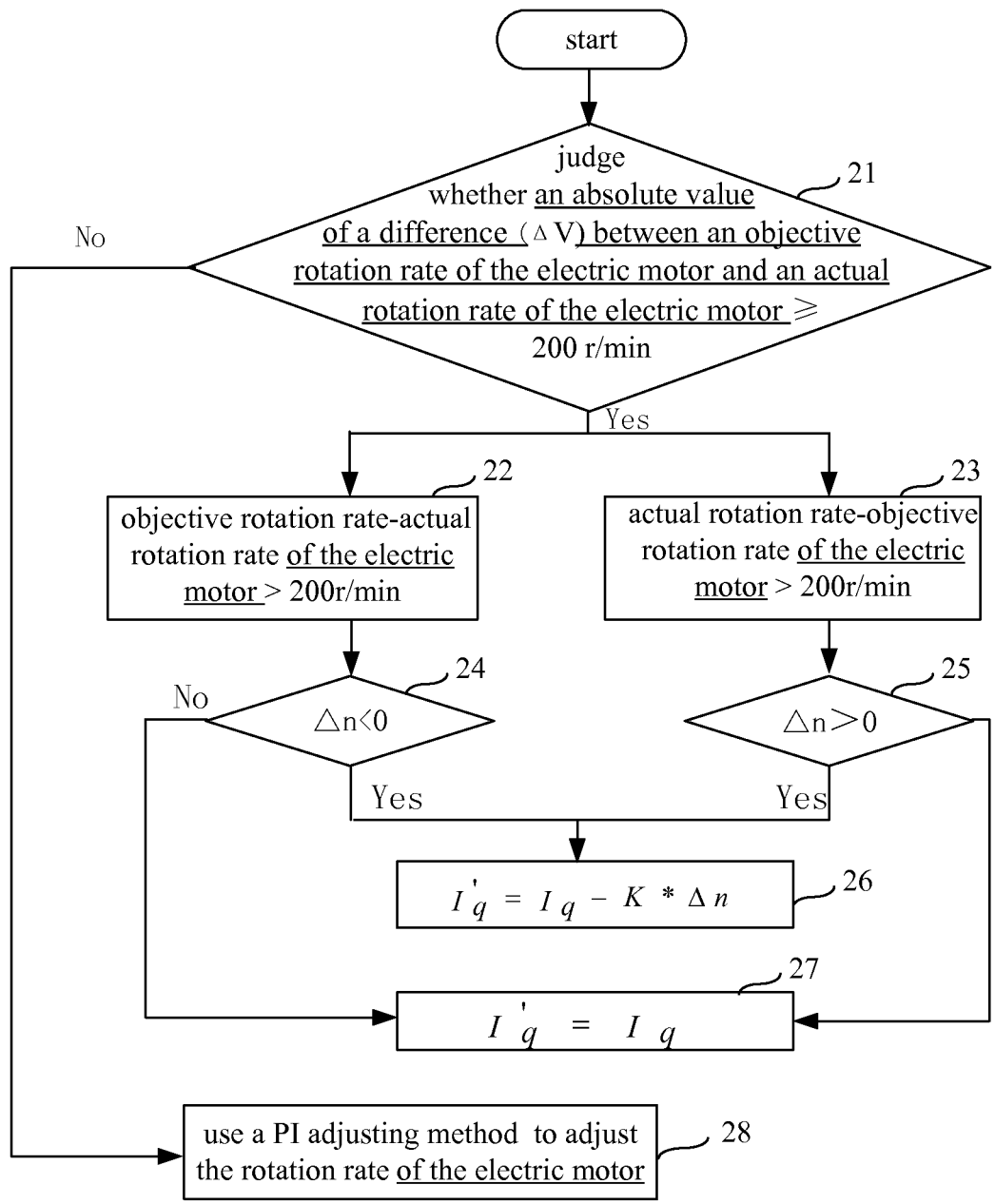
FIG. 2 is a flow chart of a method for controlling a rotation rate of an electric motor according to a second embodiment of the present disclosure.

FIG. 2 is a flow chart of a method for controlling the rotation rate of the electric motor according to a second embodiment of the present disclosure. As shown in FIG. 2, the method comprises following steps.

In step 21, it is judged that whether an absolute value of a difference ($\Delta$V) between an objective rotation rate of the electric motor and an actual rotation rate of the electric motor is greater than or equal to 200 r/min. If yes, step 22 or step 23 is performed; and otherwise, step 28 is performed.

In step 22, if the difference between the objective rotation rate and the actual rotation rate is greater than or equal to 200 r/min, step 24 is performed.

In step 23, if the difference between the actual rotation rate and the objective rotation rate is greater than or equal to 200 r/min, step 25 is performed.

In step 24, it is judged whether $\Delta n<0$; if yes, step 26 is performed, and otherwise step 27 is performed.

In step 25, it is judged whether $\Delta n>0$; if yes, step 26 is performed, and otherwise step 27 is performed.

In step 26, $I_q'=I_q-K*\Delta n$, and the process is terminated.

In step 27, $I_q'=I_q$, and the process is terminated.

In step 28, a PI adjusting method is used to adjust the rotation rate.

In this embodiment, K is a coefficient, $I_q'$ is an actual output of the q axis current, $I_q$ is a given output of the q axis current, and $\Delta n$ is a difference between an average of an actual rotation rate during current N cycles and an average of an actual rotation rate during N cycles before the current N cycles, $N \geq 1$. It should be noted that, as to explanations about these parameters (such as K, N, $\Delta n$), please refer to relevant descriptions hereinbefore.

This embodiment shows an improved technical solution based on the first embodiment. In this second embodiment, a step of judging $\Delta n<0$ or $\Delta n>0$ is included, which is for preventing an incorrect instruction resulted from a program fault. The undue instruction may reduce the rapid response of the rotation rate. For example, if the difference between the objective rotation rate and the actual rotation rate is greater than the predetermined value, $\Delta n$ is supposed to be less than 0. However, $\Delta n$ may be actually greater than or equal to 0 because of the program fault. Therefore, in order to prevent the incorrect instruction resulted from the program fault, the q axis current may not be adjusted, that is $I_q'=I_q$.

Reference throughout this specification to "an embodiment", "some embodiments", "one embodiment", "an example", "a specific examples", or "some examples" means that a particular feature, structure, material, or characteristic described in connection with the embodiment or example is included in at least one embodiment or example of the disclosure. Thus, the appearances of the phrases such as "in some embodiments", "in one embodiment", "in an embodiment", "an example", "a specific examples", or "some examples" in various places throughout this specification are not necessarily referring to the same embodiment or example of the disclosure. Furthermore, the particular features, structures, materials, or characteristics may be combined in any suitable manner in one or more embodiments or examples.

Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the claims and their equivalents.

What is claimed is:

1. A method for controlling a rotation rate of an electric motor, comprising:
    determining if an absolute value of a difference between an objective rotation rate of the electric motor and an actual rotation rate of the electric motor is greater than or equal to a predetermined value; and
    if yes, compensating a q axis current of the electric motor to adjust the rotation rate,
    wherein compensating a q axis current of the electric motor to adjust the rotation rate comprises:
        compensating a q axis current of the electric motor according to the equation $I_q'=I_q-K*\Delta n$,
        where K is a coefficient, $I_q'$ is an actual value of the q axis current, $I_q$ is a given value of the q axis current, and $\Delta n$ is a difference between an average of an actual rotation rate during current N cycles and an average of an actual rotation rate during N cycles before the current N cycles, and $N \geq 1$; and
        compensating a torque by compensating the q axis current of the electric motor to adjust the rotation rate.

2. The method according to claim 1, wherein the predetermined value ranges from about 100 RPM to about 300 RPM.

3. The method according to claim 1, wherein if yes, compensating a q axis current of the electric motor to adjust the rotation rate comprises:
    determining if $\Delta n<0$ if the difference between the objective rotation rate and the actual rotation rate is greater than or equal to the predetermined value;
    if yes, setting $I_q'=I_q-K*\Delta n$ and otherwise setting $I_q'=I_q$; and compensating a torque by compensating the q axis current of the electric motor to adjust the rotation rate; and;
    where K is a coefficient, $I_q'$ is an actual output of the q axis current, $I_q$ is a given output of the q axis current, and $\Delta n$ is a difference between an average of an actual rotation rate during current N cycles and an average of an actual rotation rate during N cycles before the current N cycles, and $N \geq 1$.

4. The method according to claim 1, wherein if yes, compensating a q axis current of the electric motor to adjust the rotation rate comprises:
    determining if $\Delta n>0$ if the difference between the actual rotation rate and the objective rotation rate is greater than or equal to the predetermined value;
    if yes, setting $I_q'=I_q-K*\Delta n$ and otherwise setting $I_q'=I_q$ and compensating a torque by compensating the q axis current of the electric motor to adjust the rotation rate; and
    where K is a coefficient, $I_q'$ is an actual output of the q axis current, $I_q$ is a given output of the q axis current, and $\Delta n$ is a difference between an average of an actual rotation rate during current N cycles and an average of an actual rotation rate during N cycles before the current N cycles, and $N \geq 1$.

5. The method according to claim 1, wherein N ranges from about 32 to about 128.

6. The method according to claim 1, wherein K ranges from about 0.05 to about 0.2.

7. A method for controlling a rotation rate of an electric motor, comprising:
    determining if an absolute value of a difference between an objective rotation rate of the electric motor and an actual rotation rate of the electric motor is greater than or equal to a predetermined value;
    if yes, compensating a q axis current of the electric motor to adjust the rotation rate; and
    using a proportional integral method to adjust the rotation rate if the absolute value of the difference between the objective rotation rate and the actual rotation rate is less than the predetermined value.

8. The method according to claim 7, wherein the proportional integral method comprises:
    calculating a difference $err(k)$ between the objective rotation rate and the actual rotation rate at a current time; and
    adjusting the rotation rate according to the equation $Out(k)=Out(k-1)+(Kp+Ki)*err(k)$,
    where Kp is a proportional coefficient, Ki is an integral coefficient, $Out(k)$ is an actual rotation rate at the current time, and $Out(k-1)$ is an actual rotation rate at a previous time.

9. A method for controlling a rotation rate of an electric motor, comprising:
    determining if an absolute value of a difference between an objective rotation rate of the electric motor and an actual rotation rate of the electric motor is greater than a predetermined value, and if the absolute difference is greater than the predetermined value, compensating a q axis current of the electric motor to adjust the rotation rate of the electric motor, wherein compensating a q axis current of the electric motor to adjust the rotation rate comprises:

compensating a q axis current of the electric motor according to the equation $I_q'=I_q-K*\Delta n$, where K is a coefficient, $I_q'$ is an actual value of the q axis current, $I_q$ is a given value of the q axis current, and $\Delta n$ is a difference between an average of an actual rotation rate during current N cycles and an average of an actual rotation rate during N cycles before the current N cycles, and N≥1; and compensating a torque by compensating the q axis current of the electric motor to adjust the rotation rate.

10. The method according to claim 9, wherein the predetermined value ranges from about 100 RPM to about 300 RPM.

11. The method according to claim 9, wherein if yes, compensating a q axis current of the electric motor to adjust the rotation rate comprises:

determining if $\Delta n<0$ if the difference between the objective rotation rate and the actual rotation rate is greater than or equal to the predetermined value;

if yes, setting $I_q'=I_q-K*\Delta n$ and otherwise setting $I_q'=I_q$ and compensating a torque by compensating the q axis current of the electric motor to adjust the rotation rate; and;

where K is a coefficient, $I_q'$ is an actual output of the q axis current, $I_q$ is a given output of the q axis current, and $\Delta n$ is a difference between an average of an actual rotation rate during current N cycles and an average of an actual rotation rate during N cycles before the current N cycles, and N≥1.

12. The method according to claim 9, wherein if yes, compensating a q axis current of the electric motor to adjust the rotation rate comprises:

determining if $\Delta n>0$ if the difference between the actual rotation rate and the objective rotation rate is greater than or equal to the predetermined value;

if yes, setting $I_q'=I_q-K*\Delta n$ and otherwise setting $I_q'=I_q$ and compensating a torque by compensating the q axis current of the electric motor to adjust the rotation rate; and where K is a coefficient, $I_q'$ is an actual output of the q axis current, $I_q$ is a given output of the q axis current, and $\Delta n$ is a difference between an average of an actual rotation rate during current N cycles and an average of an actual rotation rate during N cycles before the current N cycles, and N≥1.

13. The method according to claim 9, wherein N ranges from about 32 to about 128.

14. The method according to claim 9, wherein K ranges from about 0.05 to about 0.2.

* * * * *